(12) United States Patent
Lewis et al.

(10) Patent No.: US 10,733,825 B2
(45) Date of Patent: *Aug. 4, 2020

(54) COVERT SECURE DOCUMENT REGISTRATION SYSTEM

(71) Applicant: Troy Group, Inc., Costa Mesa, CA (US)

(72) Inventors: Brian Lewis, Wheeling, WV (US); Xiaorong Cai, Mount Pleasant, SC (US); Michael R. Riley, Steubenville, OH (US); David Altfeder, Aberdeen, NC (US)

(73) Assignee: TROY GROUP, INC., Costa Mesa, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/359,842

(22) Filed: Mar. 20, 2019

(65) Prior Publication Data

US 2019/0221064 A1    Jul. 18, 2019

Related U.S. Application Data

(62) Division of application No. 15/526,269, filed as application No. PCT/US2016/018087 on Feb. 16, 2016, now Pat. No. 10,475,269.

(Continued)

(51) Int. Cl.
*G07D 7/00* (2016.01)
*G07D 7/0043* (2016.01)
(Continued)

(52) U.S. Cl.
CPC ............. *G07D 7/003* (2017.05); *G07D 7/005* (2017.05); *G07D 7/0043* (2017.05); *G07D 7/20* (2013.01)

(58) Field of Classification Search
CPC ...... G07D 7/003; G07D 7/0043; G07D 7/005; G07D 7/20
See application file for complete search history.

(56) References Cited

U.S. PATENT DOCUMENTS 6,612,494 B1    9/2003  Outwater
8,405,882 B2    3/2013  Cole
(Continued)

FOREIGN PATENT DOCUMENTS

JP    04-237389    8/1992
JP    2007-028324  2/2007
(Continued)

OTHER PUBLICATIONS

Japanese Patent Office, Japanese Application No. 2017-533633, Office Action dated Feb. 25, 2019, 16 pages, with English translation.

(Continued)

*Primary Examiner* — Violeta A Prieto

(57) ABSTRACT

A method for creating a secure document, registering the secure document and verifying the authenticity of the secure document includes receiving a print object that has content. A security feature, including an identifier, is created and is associated with the content. The identifier may be a barcode. The barcode may represent a character string. The security feature may include the identifier barcode and a decoy barcode that is not associated with the content. The identifier barcode (or the character string represented by the barcode) and the content are transmitted to a database for storage. Once stored, the identifier and the content are considered to be registered. A print object that includes the security feature and the content is then transmitted to a printer for printing.

9 Claims, 12 Drawing Sheets

Related U.S. Application Data

(60) Provisional application No. 62/118,340, filed on Feb. 19, 2015.

(51) Int. Cl.
*G07D 7/005* (2016.01)
*G07D 7/20* (2016.01)

(56) References Cited

U.S. PATENT DOCUMENTS

| | | | |
|---|---|---|---|
| 8,756,707 B2* | 6/2014 | Green | G06K 19/10 726/30 |
| 8,817,330 B2 | 8/2014 | Cole | |
| 8,869,299 B2* | 10/2014 | Charbonneau | G06F 21/6218 726/27 |
| 8,905,313 B2* | 12/2014 | Rapoport | B41M 1/14 235/462.01 |
| 10,290,167 B2* | 5/2019 | Souparis | G07F 7/125 |
| 2004/0080777 A1 | 4/2004 | Smith | |
| 2007/0177824 A1 | 8/2007 | Cattrone et al. | |
| 2007/0220614 A1 | 9/2007 | Ellis et al. | |
| 2007/0276758 A1 | 11/2007 | Tsuzuki | |
| 2008/0149713 A1 | 6/2008 | Brundage | |
| 2008/0252066 A1 | 10/2008 | Rapoport et al. | |
| 2009/0026753 A1 | 1/2009 | Simske et al. | |
| 2009/0159658 A1 | 6/2009 | Cheung et al. | |
| 2009/0307232 A1 | 12/2009 | Hall | |
| 2010/0157378 A1 | 6/2010 | Cole et al. | |
| 2011/0283369 A1* | 11/2011 | Green | G06K 19/10 726/30 |
| 2012/0153023 A1 | 6/2012 | Morgana et al. | |
| 2013/0002713 A1 | 1/2013 | Souparis et al. | |
| 2013/0073948 A1 | 3/2013 | Bryar et al. | |
| 2013/0200606 A1 | 8/2013 | Omar | |
| 2014/0095207 A1 | 4/2014 | Dhir et al. | |
| 2015/0069117 A1* | 3/2015 | Rapoport | G06K 19/06037 235/375 |
| 2017/0330047 A1* | 11/2017 | Markin | B42D 25/30 |
| 2019/0126660 A1* | 5/2019 | Dorier | C09D 11/30 |

FOREIGN PATENT DOCUMENTS

| | | |
|---|---|---|
| JP | 2008-176710 | 7/2008 |
| JP | 2012-027695 | 2/2012 |
| JP | 2014 071468 | 4/2014 |
| WO | WO 01/03077 | 1/2001 |
| WO | WO 2008/015458 | 2/2008 |
| WO | WO 2008/066281 | 6/2008 |
| WO | WO 2010/040971 | 4/2010 |

OTHER PUBLICATIONS

International Search Report and Written Opinion of the International Searching Authority, PCT/US2016/018087, dated Jul. 26, 2016, 24 pages.

European Patent Office, Supplementary European Search Report, EP 16 75 2909, dated Oct. 5, 2018, 9 pages.

Singapore Written Opinion, Application No. 11201704748V, Intellectual Property Office of Singapore, dated Jul. 2018, 5 pages.

* cited by examiner

COVERT SECURE DOCUMENT REGISTRATION SYSTEM

CROSS REFERENCE TO RELATED APPLICATION

This is application is a divisional of application Serial Number U.S. Ser. No. 15/526,269 filed May 11, 2017 for "Covert Secure Document Registration System", which claims the benefit and priority of U.S. provisional patent application Ser. No. 62/118,340, filed on Feb. 19, 2015, titled "Covert Secure Document Registration System".

BACKGROUND OF THE INVENTION

1. Field of the Invention

The present invention relates to a system for printing and registering documents containing a printed-on security identifier and for subsequent verification of the documents using a verification device.

2. Description of Related Art

Many organizations produce documents that are transferred to other individuals or organizations. These documents often include sensitive information. Examples of such documents are bills of lading that include a list of goods in a shipment generated by shipping companies and passports issued by the U.S. Department of State.

Alteration of such documents can result in harm to the issuing organization as well as others. For example, theft of goods from a shipment may go undetected if the listing of the goods is removed from the bill of lading. As another example, suspected terrorists may enter the United States using an altered passport.

These types of documents have been used for many years. Security features have been developed and incorporated into these documents to deter alterations and forgeries. For example, watermarks, threads embedded within a substrate, complex imaging that is difficult to reproduce or the like have been used. These and other methods reduce the ability to forge or alter a document.

In spite of these prior methods, as the result of technology advances, the ability to create high quality forgeries persists. Even an expert may not be able to detect that a document is not an original if it is a high quality forgery. Even if an expert suspects that a document is forged, he may not be able to establish that the document is a forgery.

Accordingly, there is a need for systems and methods for providing secure documents and for verifying their authenticity.

SUMMARY OF THE INVENTION

A system and method for creating a secure document, registering the secure document and verifying the authenticity of the secure document is described. The method for creating and registering a secure document includes receiving a print object that has content, i.e. an image or text. A security feature is created and associated with the content. The security feature may be a single barcode. The barcode is represented by a character string. The security feature may include the security barcode and one or more decoy barcodes that are not associated with the content. The security barcode (or the character string that represents the barcode) and the content are transmitted to a database for storage. Once stored, the secure document is considered to be registered. A print object containing the content and the security feature is transmitted to a printer for printing.

Verifying authenticity of a secure document begins with capturing an image of the security feature on the document. The security feature may include the identifier barcode and decoy barcodes. The decoy barcodes are filtered out. The identifier barcode (or a character string representing the barcode) is sent to a database of a verification device, by way of a network access device. The verification device searches the database for the identifier barcode. If the identifier barcode is found in the database, the verification device indicates that the secure document is registered. If the identifier barcode is not found in the database, the verification device indicates that the secure document is not registered.

BRIEF DESCRIPTION OF THE DRAWINGS

The exact nature of this invention, as well as the objects and advantages thereof, will become readily apparent from consideration of the following specification in conjunction with the accompanying drawings in which like reference numerals designate like parts throughout the figures thereof and wherein.

DETAILED DESCRIPTION OF THE PREFERRED EMBODIMENTS

Figure 1:
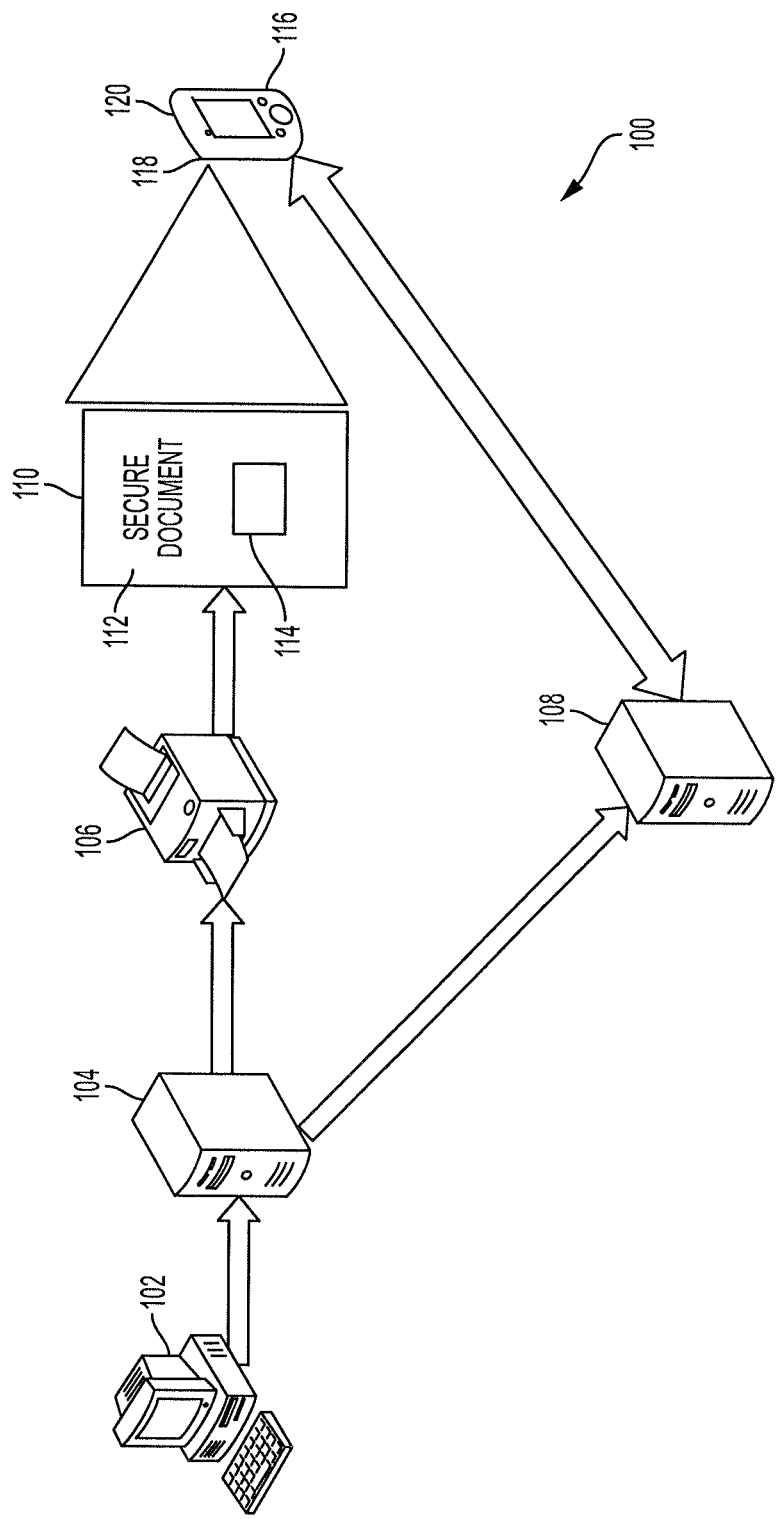
FIG. 1 is a block diagram showing features of a system for creating and verifying the authenticity of secure documents, according to an embodiment of the present invention.

Referring to FIG. 1, a system 100 for creating and verifying the authenticity of a secure document 110 is shown. The system 100 includes a print terminal 102, a print server 104, a security printer 106, a database 108 and a verification device 116.

The print terminal 102 prints documents to be secured. For example, a user may use an input device to insert content (i.e. text and/or images) for a document, and request that the document be secured and printed. In response to this request, the print terminal generates a print object. The print object is a set of data that informs the security printer 106 what is to be printed. In some embodiments the print object may be in a format usable by the document creation software and in some embodiments may be usable only by certain other software. The print terminal 102 transmits the print object to the network.

The print server 104 is a server designed to receive print objects from one or more print terminals, edit the print objects and transmit the print objects to a security printer 106. The functions of the print server 104 may be implemented by the print terminal 102. The system 100 would then not include the print server 104.

After receiving the print object, the print server 104 assigns a unique identifier, such as an identifier barcode to the print object. The barcode may be represented by a character string. The character string or the barcode may be used interchangeably as the unique identifier. The character string for the barcode may be generated using a proprietary algorithm, so that scanning the barcode with a commercially available scanner will not provide the correct character string. A proprietary scanner would be required to obtain the correct character string for the security barcode.

The print server 104 transmits the print object and the unique identifier to a database. The content and the identifier are only accessible by authorized users for verifying the authenticity of a secure printed document.

The print server 104 also generates the unique identifier. The unique identifier could include a two dimensional (2-D) barcode as will be described below with reference to FIGS. 2-5. The print server 104 creates a new print object having the content of the original print object plus the unique identifier and transmits the new print object to the security printer 106 for printing.

In response to receiving the new print object from the print server 104, the security printer 106 prints a secure document 110 containing the content 112 and the unique identifier 114. The secure document 110 is then ready for distribution to the intended recipients.

The verification device 116 verifies the authenticity of the secure document 110 upon request. The verification device 116 may be a proprietary device or may be an existing mobile device with a mobile application (app). When the verification device 116 is an existing device running an app, the app may be restricted to certain individuals or organizations. In that regard, the app may not be accessible by the general public.

In a preferred embodiment the unique identifier 114 is printed on the secure document 110 using an ultraviolet responsive ink or toner that is colorless under normal light and fluoresces under ultraviolet light. An ultraviolet (UV) light source 118 may be provided with the verification device 116 for illuminating the unique identifier 114. In some embodiments, the unique identifier 114 may be printed using visible inks, upconverting IR-responsive inks or the like. In that regard, the light source 118 may be a visible light source or may be an infrared light source.

The verification device 116 detects or captures an image of the unique identifier 114 (whether fluorescing in response to UV light or infrared light or whether visible under normal lighting) of the secure document 110 using a camera 120. The verification device 116 extracts the character string from the security feature 114 and transmits the character string to the database 108. Alternatively, the verification device 116 would transmit the security feature 114 to the database 108 and the database 108 would extract the character string.

The database 108 compares the identifier character string to a list of stored identifiers to determine whether the secure document 110 has been registered with the database 108. The database 108 transmits a signal to the verification device 116 indicating whether the identifier was found in the database. The verification device 116 then indicates whether the security feature has been registered.

Alternatively, the verification device 116 detects some or all of the content 112 of the secure document and it or the database 108 compares the content 112 to the stored content associated with the identifier to determine if the content matches.

If the user believes that the secure document 110 is fraudulent after being informed that the secure document 110 is registered, the user may request to view a copy of the original content. The verification device 116 requests a copy of the original content from the database 108 and the database 108 transmits a copy of the original content to the verification device 116. The verification device 116 outputs the original content so that the user can compare the original content to the detected content 112 of the secure document 110.

Turning now to FIGS. 2 through 5, the security feature 114 may resemble a 2-D barcode (barcode) and may include two or more individual barcodes. In particular, the security feature 114 includes an identifier barcode 202, a first decoy barcode 204 and a second decoy barcode 206. Each of the barcodes 202, 204, 206 is printed using a different color. For example, the identifier barcode 202 may be printed using a red ink, the first decoy barcode 204 may be printed using a blue ink and the second decoy barcode 206 may be printed using a yellow ink. In some embodiments the inks are ultraviolet responsive inks that are colorless under normal lighting and fluoresce when illuminated by ultraviolet light. In some embodiments, the inks are upconverting, or infrared responsive, inks that are colorless under normal lighting and fluoresce when illuminated by infrared light. In some embodiments, the inks are visible when illuminated by light in the visible light spectrum.

A decoy barcode does not represent the identifier. In some embodiments when a user scans a decoy barcode using a readily-available QR code scanner, nothing may happen. In some embodiments the user may be directed to a website or be provided a decoy identifier.

The website may be set up by the organization that is implementing the secure document system. The website may determine the identifier of the secure document associated with the decoy barcode that is being scanned. In some embodiments the website may notify authorities and/or note in the database that the document may be altered or forged.

In some embodiments the character string represented by the identifier barcode 202 may only be determined using a proprietary barcode scanner. For example, a proprietary verification device or an app of a verification device may be designed to determine the character string upon scanning the identifier barcode 202 while scanning the identifier barcode 202 using a traditional barcode scanner will result in another character string or website that is not the correct character string. In that regard, scanning the identifier barcode 202 with a commercially available barcode scanner may direct the user to the same or a similar website as described above with reference to the decoy barcodes.

Figure 2:
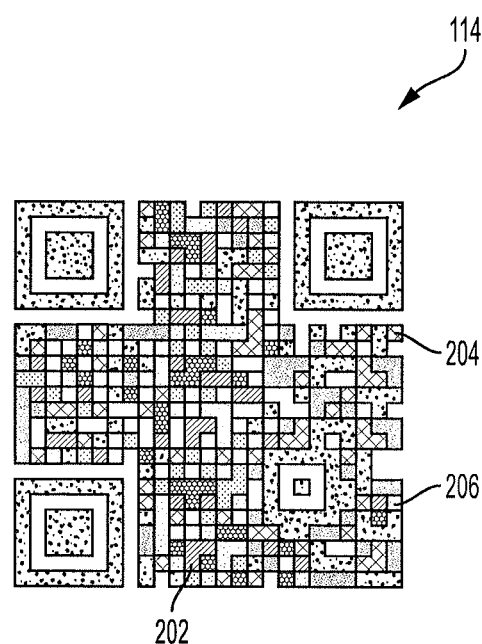
FIG. 2 is a picture of a security feature containing one security barcode and two decoy barcodes.
Figures 3, 4, 5:
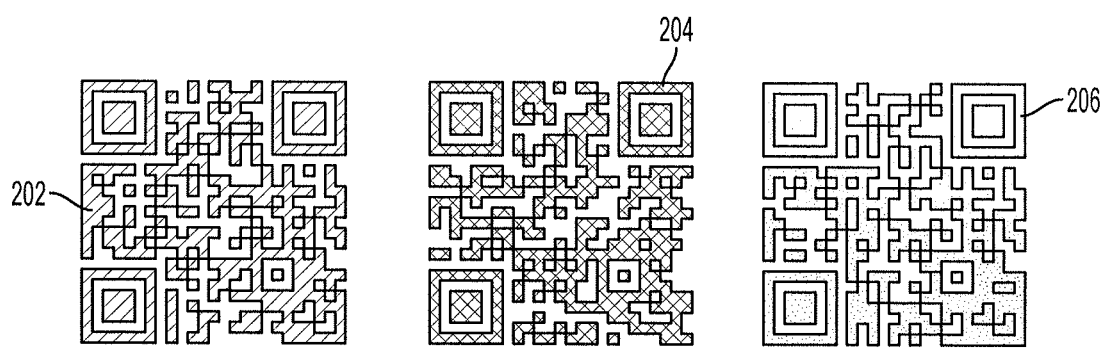
FIG. 3 is a picture of the security barcode that is incorporated into the security feature of FIG. 2.
FIG. 4 is a picture of a decoy barcode that is incorporated into the security feature of FIG. 2.
FIG. 5 is a picture of another decoy barcode that is incorporated into the security feature of FIG. 2.

Referring briefly to FIGS. 1 and 2, the verification device 116 includes a physical or logical filter for filtering out the decoy barcode 204, 206. For example, the verification device 116 may include software capable of filtering out the colors of the decoy barcodes 204, 206. After capturing the image of the security feature 114, the verification device 116 filters out blue and yellow colors, removing the decoy barcodes 204 and 206. This can be performed regardless of whether one or more of the identifier barcode 202 and the decoy barcodes 204, 206 are printed using ultraviolet responsive ink, infrared responsive ink or visible ink.

The security feature 114 provides multiple levels of security. In order to even determine the identifier, a forger will need to be aware of the presence of the security feature 114. Awareness of the security feature 114 is difficult due to it being colorless. The forger will need to subject the security feature 114 to ultraviolet light in order to capture an image of the security feature 114. He will need to determine which barcode(s) 202, 204, 206 identifier barcode and which are decoy barcodes and must also filter out the decoy barcodes. In embodiments in which the character string can only be determined using a proprietary barcode scanner, the forger must also find a copy of the proprietary barcode scanner.

Figure 6:
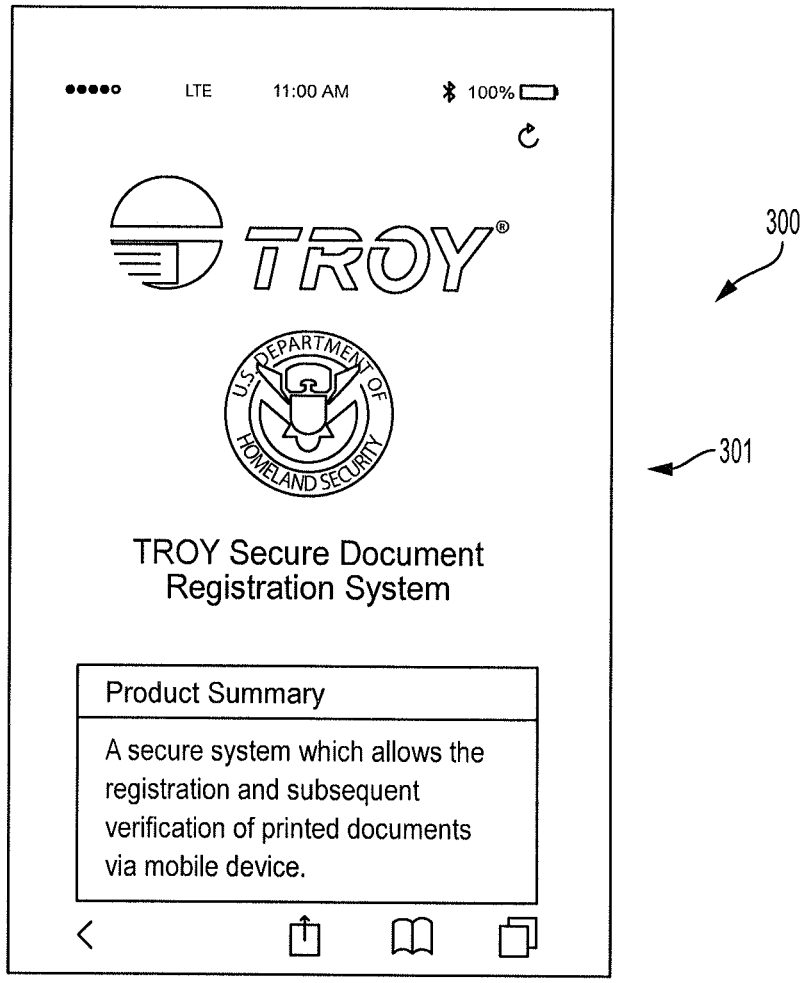
FIG. 6 is a representation of a display on a verification device designed to verify the authenticity of a secure documents.

Referring now to FIGS. 1 and 6, the verification device 116 performs functions to verify the authenticity of the secure document. The verification device 116 includes an interface, such as a graphical user interface (GUI) 300, through which a user can control its functions. The functions and GUI 300 of the verification device 116 are implemented using software, firmware and/or dedicated hardware. The software, firmware and/or dedicated hardware may be provided as part of the verification device 116 or may be installed on the verification device 116 as a mobile application (app).

When the verification functions of the verification device 116 are operational a base screen 301 is shown on the GUI 300. A user then directs the camera 120 towards the security feature 114. In some embodiments the verification device 116 continuously or periodically monitors for security features and automatically captures the security feature 114 when it is detected. In some embodiments the user requests the verification device 116 it to capture the security feature 114 via an input.

Figure 7:
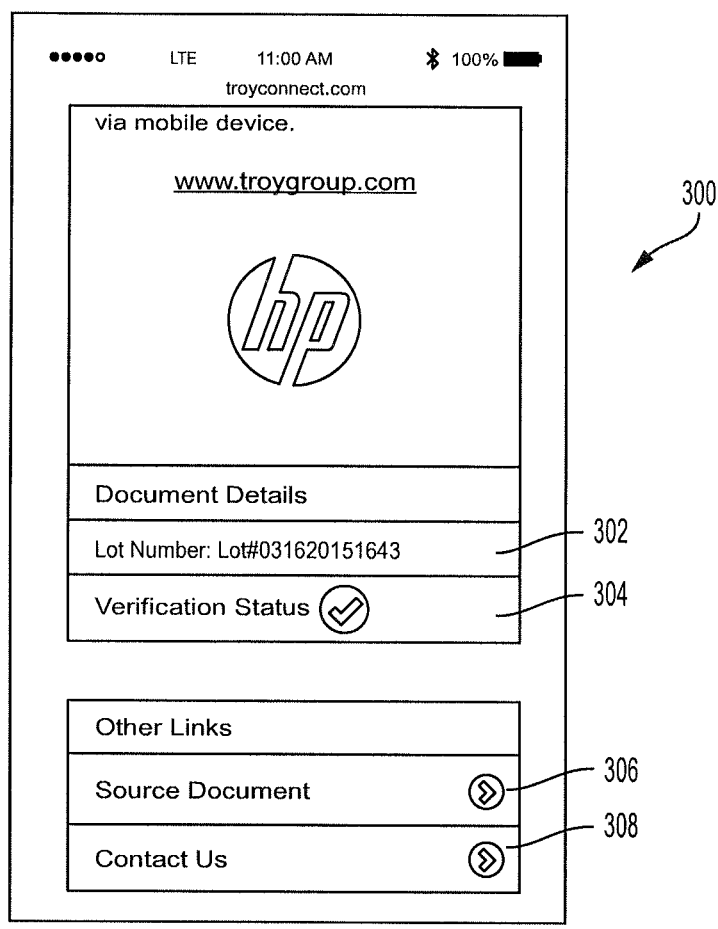
FIG. 7 is a representation of a display on a verification device indicating that a security barcode is registered.

Referring now to FIGS. 1 and 7, the GUI 300 includes a field showing the character string 302 represented by the identifier barcode 114. The character string 302 is transferred to the database 108. An indication of whether the character string 302 is registered is provided to the verification device 116. The GUI 300 includes a status field 304 showing whether the character string 302 is registered based on the data received from the database 108.

The GUI 300 also includes a contact button 308. The verification device 116 may provide contact information of a help center or may automatically connect the user to the help center in response to the contact button 308 being selected.

Figure 8:
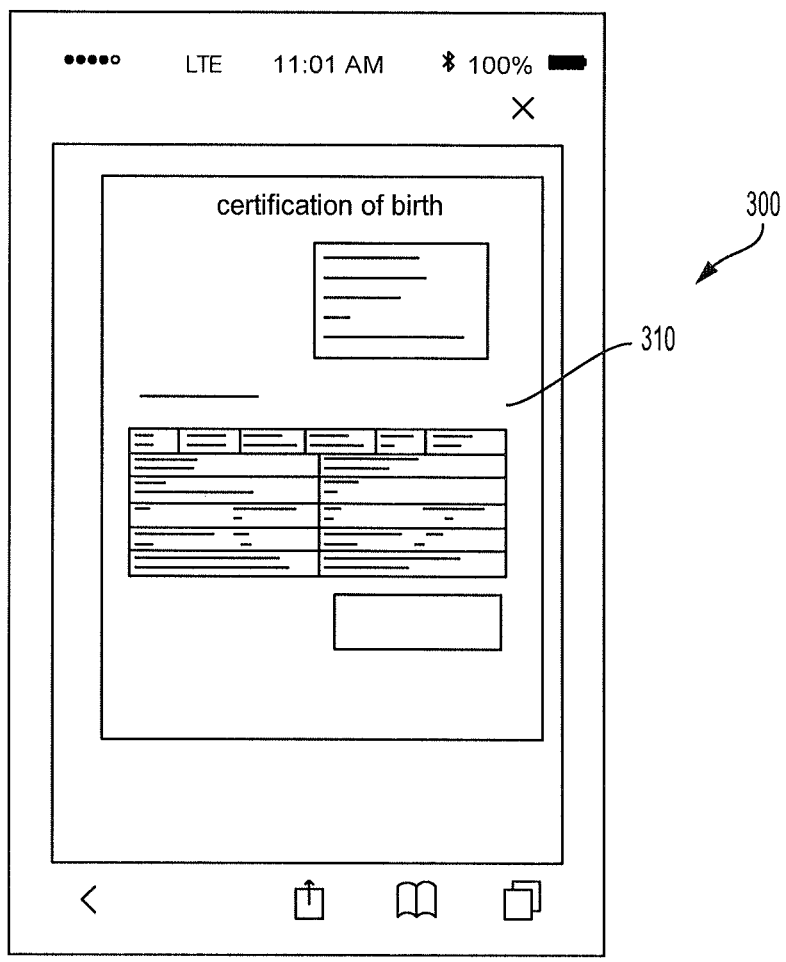
FIG. 8 is a representation of a display on a verification device displaying a copy of a requested secure document.

The GUI 300 also includes a view source button 306. The buttons 306, 308 may be mechanical buttons on the verification device 116 and/or may be logical buttons as shown in FIGS. 7 and 8. The verification device 116 requests a copy of the original content from the database 108 in response to selection of the view source button and the database 108 transmits the copy to the verification device 116.

Referring now to FIGS. 1 and 8, the GUI 300 displays the copy of the content 310 of the original print object. The user can then compare the content 310 of the original print object to the content 112 of the secure document 110. If the content matches, the user may feel confident that the secure document 110 is authentic. If the content does not match, the user may assume that the secure document 110 is altered or forged.

In some embodiments the verification device 116 compares some or all of the content 310 to some or all of the content 112 to determine the authenticity of the secure document 110. This may be done initially when verifying whether the identifier is registered or may be done in response to another user input (not shown).

Figure 9:
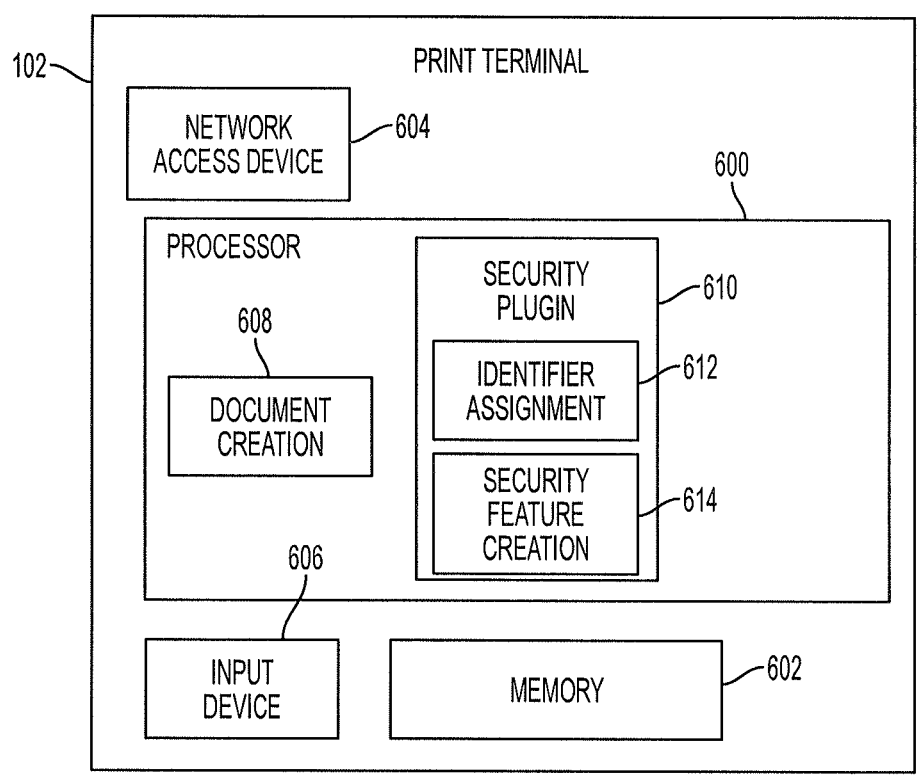
FIG. 9 is a block diagram of a print terminal for receiving a document, creating a security feature, associating the security feature with the document and registering the security feature and the document.

Turning now to FIG. 9, components of the print terminal 102 are shown. The print terminal 102 includes a processor 600, a memory 602, a network access device 604 and an input device 606.

The input device 606 may include any device capable of receiving user input such as one or more of a mouse, a keyboard, a microphone, a camera, a scanner, a biometric authentication device or the like. The biometric authentication device can detect a biometric of a potential user such as a fingerprint, an image of an eye, a voice or the like. The biometric authentication device may only allow use of the print terminal 102 if the detected biometric of the potential user matches an authorized biometric. In that regard, only authorized users can use the input device 606. This prevents unauthorized creation and registration of secure documents.

The network access device 604 may include any network access device capable of communicating with other devices on a network, such as via Wi-Fi, Bluetooth, 3G, 4G or the like. In some embodiments the network access device 604 may include an input/output (I/O) port capable of communicating directly with another device, such as via a USB connector, a serial connector or the like.

The memory 602 may be a non-transitory memory capable of storing data. The memory 602 may or may not be separate from a memory of the processor 600. In that regard, the memory 602 may store instructions to be executed by the processor 600.

The processor 600 may include one or more processors and be capable of implementing logic. The processor 600 can be a general purpose processor, a digital signal processor (DSP), an application specific integrated circuit (ASIC), a field programmable gate array (FPGA) or other programmable logic device, discreet gate or transistor logic, discreet hardware components, or any combination thereof.

The processor 600 includes a document creation unit 608 and a security plugin 610. As described above with reference to FIG. 1, the features of the security plugin 610 may be performed by the print server 104 instead of, or in addition to, the print terminal 102.

The document creation unit 608 is used to create a document having the desired content. For example, the print terminal 102 may be used to create a passport for an individual and may receive an image of the individual and text corresponding to the individual via the input device 606. The document creation unit 608 creates the print object including the content.

The security plugin 610 receives the print object after it has been created by the document creation unit 608. The security plugin 610 includes an identifier assignment unit 612 and a security feature creation unit 614. The identifier assignment unit 612 generates and/or assigns the unique identifier to the print object. The security feature creation unit 614 creates the security feature that includes the unique identifier.

After the identifier has been assigned and the security feature has been created, the security plugin 610 creates a secure print object including both the content received from the document creation unit 608 and the security feature. The security plugin 610 then transmits the secure print object to the network access device 604.

After receiving the secure print object, the network access device 604 transmits the secure print object to the security printer for printing. The security printer may include ultraviolet ink and/or toner if the security feature is to include ultraviolet responsive colors.

Figure 10:
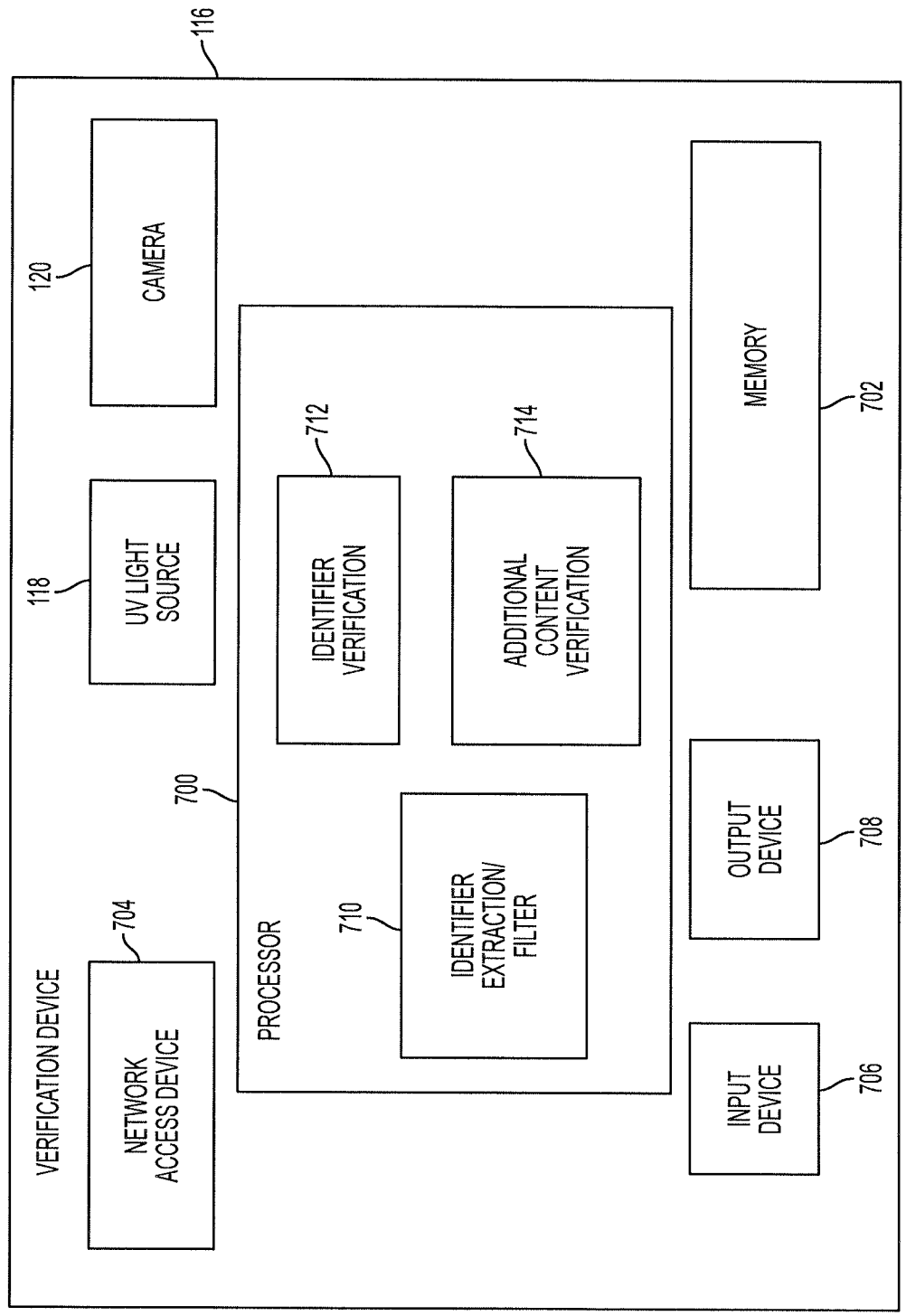
FIG. 10 is a block diagram of a verification device for verifying the authenticity of a secure document.

Turning now to FIG. 10, components of the verification device 116 are shown. The verification device 116 includes a processor 700, a memory 702, a network access device 704, an input device 706, an output device 708, the UV light source 118 and the camera 120.

The UV light source 118 may include any light source capable of outputting ultraviolet light. In some embodiments the UV light source 118 outputs UV light of multiple wavelengths. For example, a security feature may include three UV-responsive inks that each fluoresce when illuminated by UV light of a different wavelength. The UV light source 118 may output UV light of each of the wavelengths.

In some embodiments the inks of the security feature are not ultraviolet responsive. The UV light source 118 may not be included or may output light having a wavelength in the visible spectrum (such as via an LED light source). In some embodiment, the security feature may be printed using infrared-responsive ink or toner. The UV light source 118 may instead output infrared light.

The camera 120 may include any camera or sensor capable of detecting image data. The camera 120 is oriented towards the direction of light output of the UV light source 118 so that the camera 120 can detect images illuminated by the UV light source 118.

The input device 706 may include any device capable of receiving user input such as a mouse, a keyboard, a microphone, a camera, a scanner, a biometric authentication device or the like. The biometric authentication device can detect a biometric of a potential user such as a fingerprint, an image of an eye, a voice or the like. The biometric authentication device may only allow use of the verification device 116 if the detected biometric of the potential user matches an authorized biometric. In that regard, only authorized users can use the verification device 116. This prevents unauthorized users from gaining access to the capabilities of the verification device 116.

The output device 708 may include any device capable of outputting data such as a display, a microphone or the like. In some embodiments the output device 708 includes an output port, such as a USB port, capable of outputting data to be received by another device such as an external display.

The network access device 604 may include any network access device capable of communicating with other devices on a network, such as via Wi-Fi, Bluetooth, 3G, 4G or the like. In some embodiments the network access device 604 may include an input/output (I/O) port capable of communicating directly with another device such as via a USB connector, a serial connector or the like.

The memory 702 may be a non-transitory memory capable of storing data. The memory 702 may or may not be separate from a memory of the processor 700. In that regard, the memory 702 may store instructions to be executed by the processor 700.

The processor 700 may include one or more processors and be capable of implementing logic. The processor 700 can be a general purpose processor, a digital signal processor (DSP), an application specific integrated circuit (ASIC), a field programmable gate array (FPGA) or other programmable logic device, discreet gate or transistor logic, discreet hardware components or any combination thereof.

The processor 700 includes an identifier extraction/filter unit 710, an identifier verification unit 712 and an additional image/text verification unit 714. The identifier extraction/filter unit 710 receives the image data from the camera 120 and extracts the identifier therefrom. For example, the identifier may include an identifier barcode and the security feature may include two additional decoy barcodes. The identifier extraction/filter unit 710 filters out the colors of the decoy barcodes leaving the identifier barcode.

In embodiments in which a proprietary barcode scanner is required to determine the character string represented by the identifier barcode, the identifier extraction/filter unit 710 also includes the capabilities of the proprietary barcode scanner.

The identifier verification unit 712 communicates with the database via the network access device 704 after the identifier extraction/filter unit 710 extracts the identifier. The identifier verification unit 712 transmits the extracted identifier to the database and receives feedback data indicating whether the extracted identifier is registered.

In some embodiments the verification device 116 also determines whether additional data from the secure document matches corresponding data from the original document. In these embodiments, the additional content verification unit 714 communicates with the database to determine whether the portion of the secure document matches the corresponding portion of the original document. In some embodiments the additional content verification unit 714 transmits the additional content to the database and the database determines whether the additional content matches the stored original content. In some embodiments the database transmits the original content to the verification device 116 and the additional content verification unit 714 compares the detected portion of content to the received portion of content.

Figure 11:
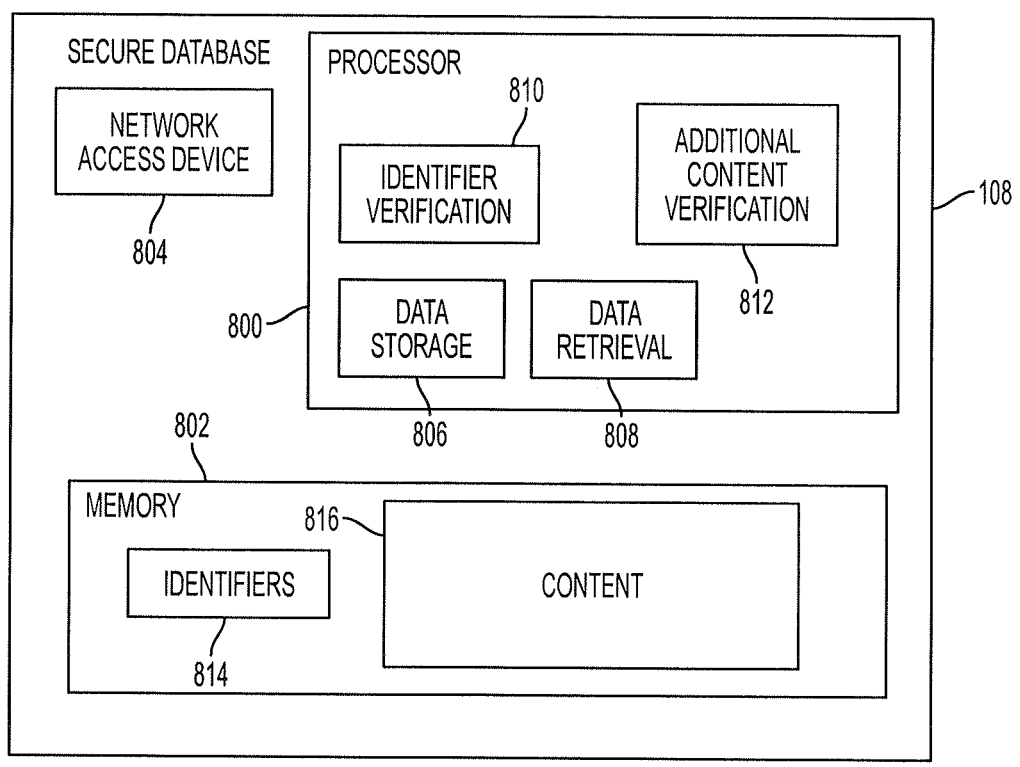
FIG. 11 is a block diagram of a database for storing security features and associated documents.

Turning now to FIG. 11, components of the database 108 are shown. The database 108 includes a processor 800, a memory 802 and a network access device 804.

The network access device 804 may include any network access device capable of communicating with other devices on a network, such as via Wi-Fi, Bluetooth, 3G, 4G or the like. In some embodiments the network access device 804 may include an input/output (I/O) port capable of communicating directly with another device, such as via a USB connector, a serial connector or the like.

The memory 802 may be a non-transitory memory capable of storing data. The memory 802 may or may not be separate from a memory of the processor 800. In that regard, the memory 802 may store instructions to be executed by the processor 800.

The processor 600 may include one or more processors and be capable of implementing logic. The processor 800 can be a general purpose processor, a digital signal processor (DSP), an application specific integrated circuit (ASIC), a field programmable gate array (FPGA) or other programmable logic device, discreet gate or transistor logic, discreet hardware components, or any combination thereof.

The processor 800 includes a data storage unit 806, a data retrieval unit 808, an identifier verification unit 810 and an additional content verification unit 812.

The data storage unit 806 receives, via the network access device 804, a request from a print terminal or print server to store data. The received data includes an identifier and a copy of the content of a print object. In response to receiving this request, the data storage unit 806 stores the identifier 814 and the content 816 in the memory 802. The identifier 814 is associated with the content 816 so that the content 816 can be accessed using the identifier 814.

The processor 800 may receive, via the network access device 804, a request from a verification device to verify whether an identifier has been registered. The identifier verification unit 810 searches the memory 802 to determine whether the received identifier is stored with the list of identifiers 814. If so, the identifier verification unit 810 outputs, via the network access device 804, data indicating that the identifier is registered.

The processor 800 may also receive, via the network access device 804, a request to provide a copy of original content corresponding to the identifier. The data retrieval unit 808 searches for the identifier in the memory 802 and retrieves the corresponding content based on the identifier. The data retrieval unit 808 transmits the retrieved content of the original secure document to the verification device via the network access device 804.

The processor 800 may also receive a request to compare a portion of detected content to a portion of content from an original document. The additional content verification unit 812 retrieves a copy of the original content from the memory 802 and compares the received content to the stored content. The additional content verification unit 812 transmits, via the network access device 804, data indicating whether the received additional content matches the stored content.

Figure 12:
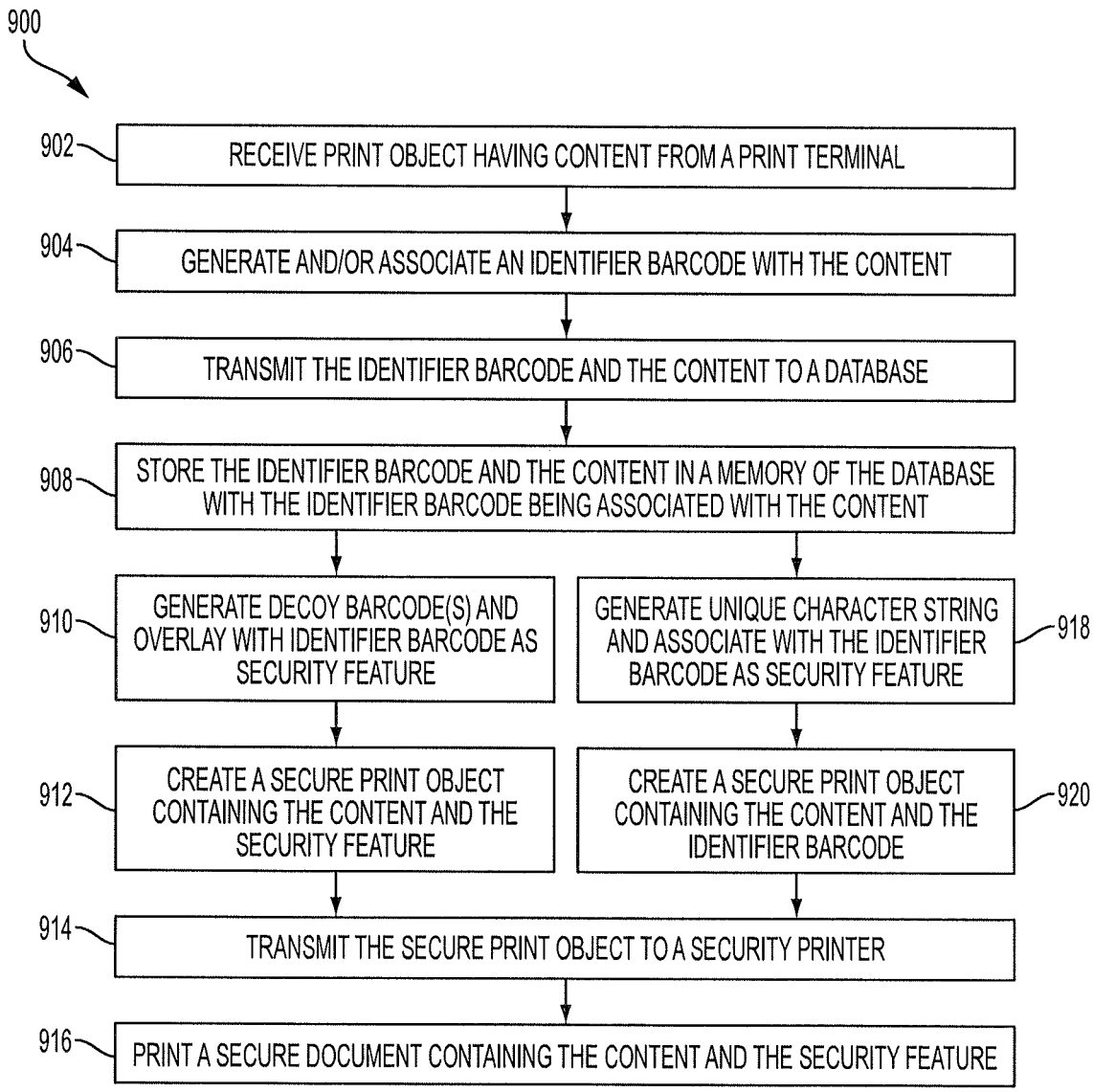
FIG. 12 is a flowchart for creating a security feature, associating the security feature with a document and registering the security feature and document.

Turning to FIG. 12, a method 900 for printing and registering a secure document is shown. The method 900 may be performed by a print terminal such as the print terminal 102 of FIG. 1, or by a print server such as the print server 104 of FIG. 1.

A processor of the print terminal or server receives a print object 902. The print object includes content. The print object may be received by a processor of a print terminal from a document creation unit of the processor of the print terminal, or may be received by a processor of a print server if the print object is created by a print terminal.

The processor generates and/or associates an identifier with the content after it is received in block 904. The processor then transmits the identifier and the content of the print object to a database in block 906. The database then stores the barcode identifier and the content in the memory in block 908. The barcode identifier and the content are associated in the memory such that the content can be accessed by providing the identifier to the database. After the barcode identifier and the content are stored in the database, the identifier and the content are considered to be registered.

After the secure document has been registered, the processor may generate a security feature that is associated with the barcode identifier. In some embodiments, the processor generates one or more decoy barcodes and overlays the decoy barcodes with the identifier barcode as the security feature as shown in block 910

In some embodiments, the processor generates a unique character string and associates the unique character string with the identifier barcode as the security feature as shown in block 918. The unique character string is a character string that can only be obtained by scanning the identifier barcode with a proprietary barcode scanner; a conventional barcode scanner will produce a result other than the unique character string. In some embodiments, the processor may generate and associate a unique character string with the barcode as shown in block 918 and generate and overlay one or more decoy barcodes with the identifier barcode as shown in block 910.

After the security feature is generated in block 910, the processor creates a secure print object that includes the content of the original print object along with the security feature in block 912. After the unique character string is generated and associated with the identifier barcode in block 918, the processor creates a secure print object having the content and the identifier barcode in block 920.

The processor then transmits the secure print object to a security printer via a network access device in block 914. The security printer then prints the secure document having the security feature and the content in block 916.

Figure 13:
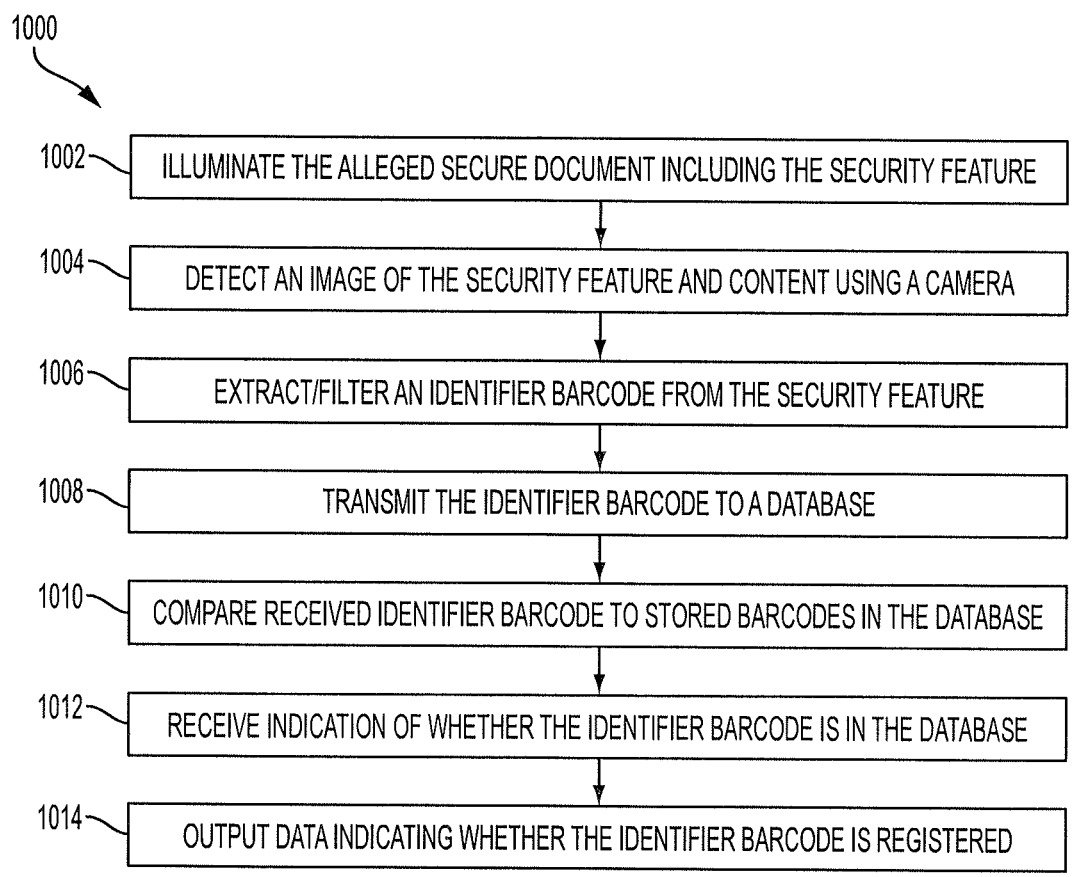
FIG. 13 is a flowchart illustrating a method for validating the registration of an identifier barcode of an alleged secure document.

Turning to FIG. 13, a method 1000 for verifying the authenticity of a secure document is shown. The method 1000 is to be performed by a verification device such as the verification device 116 of FIG. 1.

A processor of the verification device controls an ultraviolet light source to illuminate the secure document or a portion of the secure document including the security feature in block 1002. This step may be unnecessary if the security feature is not printed using ultraviolet-responsive ink. In some embodiments a user may manually turn on an ultraviolet light source of the verification device or an external ultraviolet light source instead of the light source being controlled by the processor.

After the security feature is illuminated, the processor causes a camera of the verification device to capture image data corresponding to the security feature in block 1004.

The processor then receives the image data from the camera and extracts and/or filters the barcode identifier from the security feature in block 1006. For example, the processor may filter out dummy barcodes, leaving the barcode identifier. As another example, the processor may determine the unique character string that is associated with the identifier barcode.

After the identifier barcode has been extracted, the processor transmits the identifier barcode to the database in block 1008.

The database receives the barcode identifier and compares the received barcode identifier to a list of stored barcode identifiers in the memory in block 1010. The database then transmits an indication of whether or not the received barcode identifier matches a barcode identifier in the memory (i.e. is registered). The verification device receives the indication of whether the barcode identifier is registered in block 1012 and outputs data indicating whether the identifier barcode is registered in block 1014.

Figure 14:
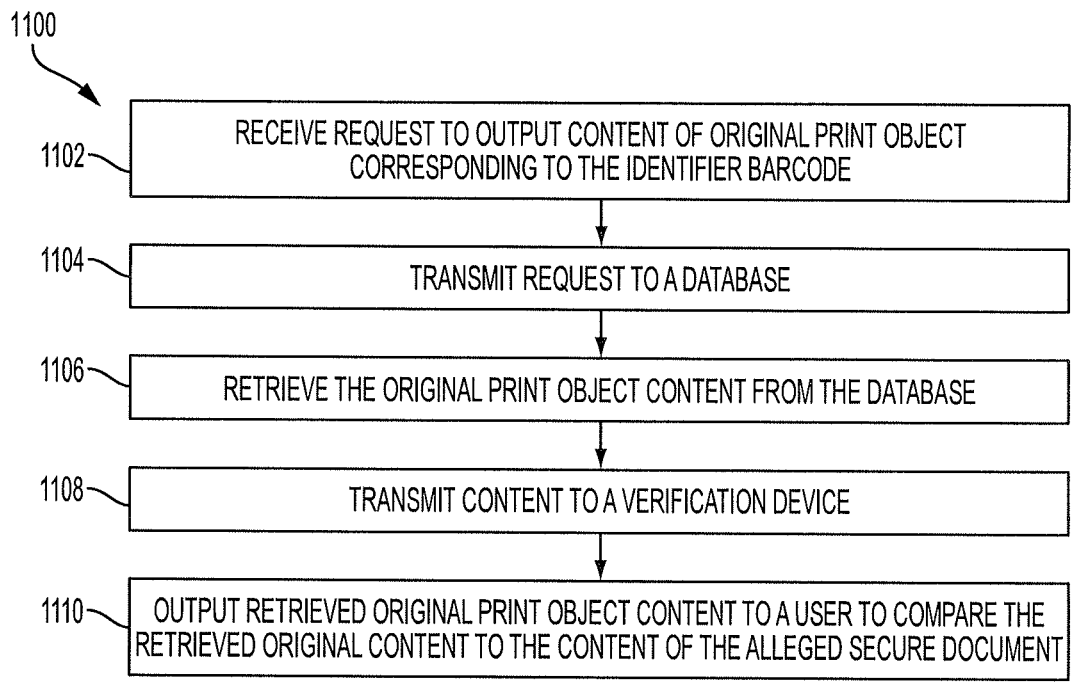
FIG. 14 is a flowchart illustrating a method for outputting content of an original print object that is associated with an identifier barcode.

Turning to FIG. 14, a method 1100 for outputting content of an original print object that corresponds to an identifier barcode is shown. The method 1100 is to be performed by a verification device such as the verification device 116 of FIG. 1 and may be performed after the registration of the identifier barcode is validated. The user may request to view the content of the original print object if the user does not believe the alleged secure document is the genuine article.

The method 1100 starts when an input device of the verification device receives a request to output content of the original print object that is associated with a previously-detected barcode identifier in block 1102. The verification device then transmits the request to the database in block 1104. The content of the original print object is retrieved from a memory of the database in block 1106 and transferred to the verification device in block 1108. The content is then output in block 1110 so that the user can compare the received content to the content of the alleged secure document. If the content of the original print object is not the same as the content of the alleged secure document, the user can safely assume that the alleged secure document is not authentic.

Figure 15:
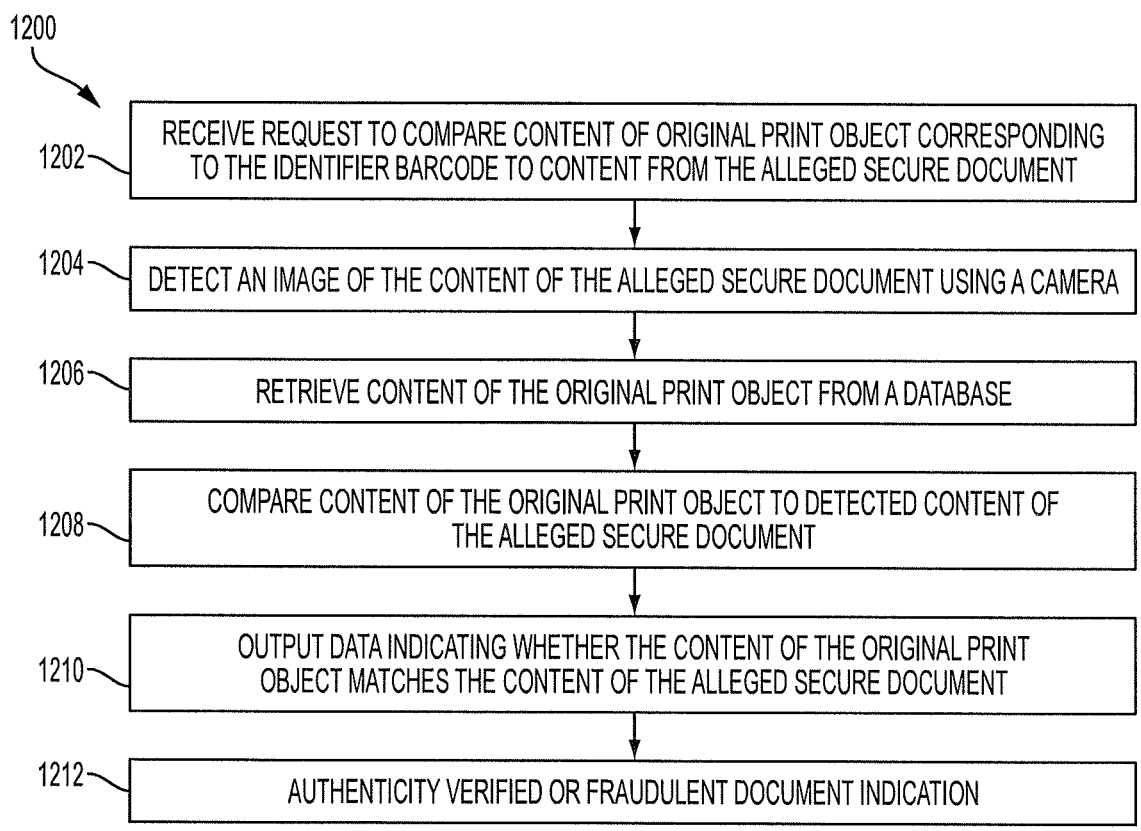
FIG. 15 is a flowchart illustrating a method for comparing content of an original print object to content of an alleged secure document.

Turning to FIG. 15, a method 1200 for comparing content of an original print object to content of an alleged secure document is shown. The method 1200 is to be performed by a verification device such as the verification device 116 of FIG. 1 and may be performed after the registration of the identifier barcode is validated. The user may request for the content to be compared if the user does not believe the alleged secure document is the real secure document.

The method 1200 starts when an input device of the verification device receives a request to compare content of the original print object that is associated with a previously-detected barcode identifier to content of the alleged secure document in block 1202. An image of the content of the alleged secure document is then detected using a camera in block 1204. In some embodiments the camera is integral to the verification device.

Content of the original print object is then retrieved from memory by the database in block 1206. The content of the original print object is then compared to the detected content of the alleged secure document in block 1208. Either the verification device or the database can make this comparison. Data is then output by an output device indicating whether the content of the original print object matches the content of the alleged secure document in block 1210. If the content of the original print object matches the content of the alleged secure document, the authenticity of the alleged secure document is verified or the document is indicated as fraudulent in block 1212.

Although the present invention is set forth herein in the context of the appended drawing figures, it should be appreciated that the invention is not limited to the specific form or forms shown. Modifications, variations, and enhancements in the design and arrangement of the method and device set forth herein may be made without departing from the spirit and scope of the present invention as set forth in the appended claims.

What is claimed is:

1. A method for creating a secure document and verifying that the secure document is authentic, the method comprising:
   receiving a print object, designating content to be printed, at a first processor;
   the first processor generating a unique identifier for the print object associating the unique identifier with the content;
   the first processor transmitting the print object content and associated unique identifier to storage;
   the first processor generating decoy identifiers and overlaying the unique identifier with at least one decoy identifier;
   the first processor transmitting the print object content and associated unique identifier overlayed with the decoy identifier to a printer for printing the print object content and the decoy overlayed unique identifier as a secure document;
   detecting the printed secure document with the decoy overlaid unique identifier to verify authenticating of the secure document;
   transmitting the detected print object content and decoy overlaid unique identifier to a second processor associated with the storage;
   the second processor filtering the decoy identifier from the unique identifier;
   the second processor comparing the unique identifier with unique identifiers stored in the storage; and
   outputting an indicator that the unique identifier is in the storage, thereby authenticating the printed secure document.

2. The method of claim 1 wherein the unique identifier overlaid with the decoy identifier comprise a security feature for the secure document.

3. The method of claim 2 wherein filtering the decoy identifier comprises using a logical or physical filter to remove the decoy identifier from the security feature leaving only the unique identifier.

4. The method of claim 1 wherein the unique identifier and decoy identifier are printed using ultraviolet responsive ink or toner.

5. The method of claim 1 wherein the unique identifier is a first two dimensional (2-D) barcode having a first color, the decoy identifier is a second 2-D barcode having a second color, and overlaying the first 2-D barcode with the second 2-D barcode creates a security feature for the secure document.

6. The method of claim 5 wherein filtering the decoy identifier comprises using a filter of the second color to remove the decoy identifier from the security feature.

7. The method of claim 5 wherein:
   the first color and the second color are ultraviolet responsive colors that fluoresce when illuminated using ultraviolet light, or
   the first color and the second color are infrared responsive colors that fluoresce when illuminated using infrared light, or
   the first color and the second color are colors that are visible when illuminated using light in the visible spectrum.

8. The method of claim 1 further comprising:
   capturing, using a camera, at least part of the content;
   transmitting, by the second processor, the at least part of the content to the storage, wherein receiving the at least part of the content includes receiving data indicating that the detected at least part of the content matches the stored content.

9. The method of claim 1 further comprising:
   capturing, using a camera, at least part of the content;
   receiving, from the storage a corresponding part of the content; and
   determining, by the second processor, that the camera captured part of the content matches the received part of the content.

* * * * *